United States Patent [19]
Lederman

[11] Patent Number: 5,201,386
[45] Date of Patent: Apr. 13, 1993

[54] WICK FEED BEARING LUBRICATION SYSTEM

[75] Inventor: Frederick E. Lederman, Sandusky, Ohio

[73] Assignee: General Motors Corporation, Detroit, Mich.

[21] Appl. No.: 906,345

[22] Filed: Jun. 30, 1992

[51] Int. Cl.$^5$ .............................................. F16N 7/12
[52] U.S. Cl. ..................................... 184/64; 384/409; 384/469
[58] Field of Search ............................ 184/64, 87, 102; 384/408, 409, 410, 413, 469

[56] References Cited

U.S. PATENT DOCUMENTS

| | | | |
|---|---|---|---|
| 105,146 | 7/1870 | Von Jeinsen | 384/410 |
| 569,847 | 10/1896 | Tucker | 384/408 |
| 1,093,609 | 4/1914 | Doeg | 184/64 |
| 1,238,367 | 8/1917 | Weber | 384/409 |
| 1,354,544 | 10/1920 | Fisher | 184/64 |
| 1,390,443 | 9/1921 | Janette | 384/409 |
| 2,462,172 | 11/1945 | Esarey | 384/409 |
| 2,999,725 | 9/1961 | Schaefer | 384/408 |
| 3,033,580 | 1/1961 | Pickert | 184/102 |
| 3,890,021 | 6/1975 | Smith et al. | 384/409 |

FOREIGN PATENT DOCUMENTS 247793  11/1963  Australia .............................. 184/102

Primary Examiner—Edward K. Look
Assistant Examiner—Gregory F. Bulla
Attorney, Agent, or Firm—Patrick M. Griffin

[57] ABSTRACT

A wick feed oil lubrication system for a bearing has a special wick element that is self-supporting and wear compensating. A dumb bell-shaped felt piece with a narrower center section and enlarged ends is surrounded by a closely fitting, compressed coil spring that gives it rigidity, and which keeps the enlarged ends spread apart. When installed, the wick element and supporting spring are compressed between the bearing spindle and bottom wall of the oil reservoir, running through a loosely fitting passage in the surrounding hub. Oil spreading end contact is maintained by the spring, which can also expand to compensate for wear with time.

2 Claims, 3 Drawing Sheets

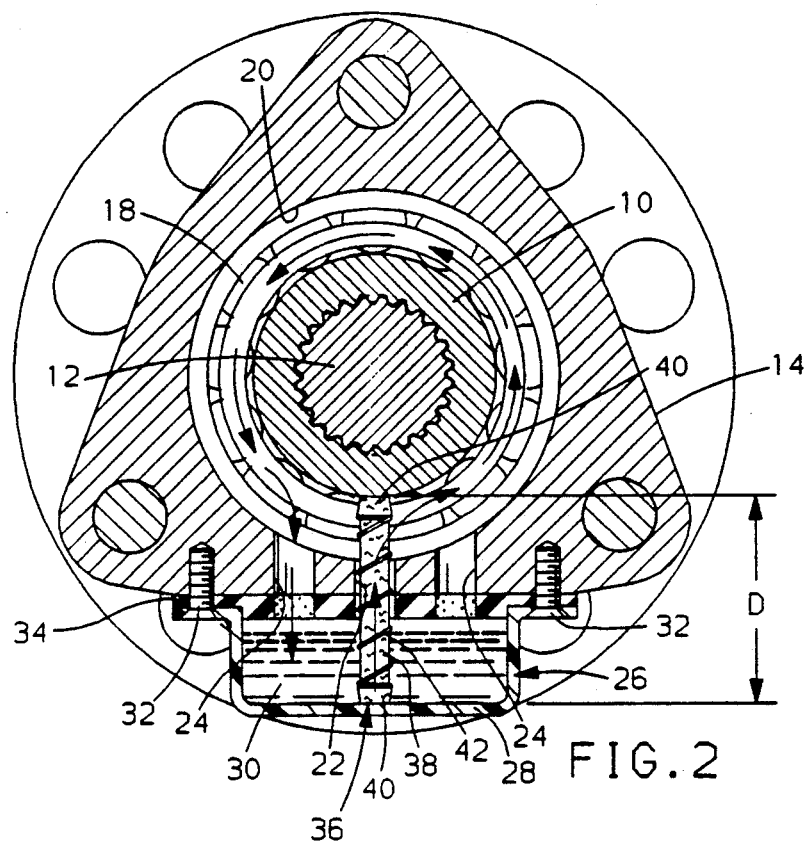
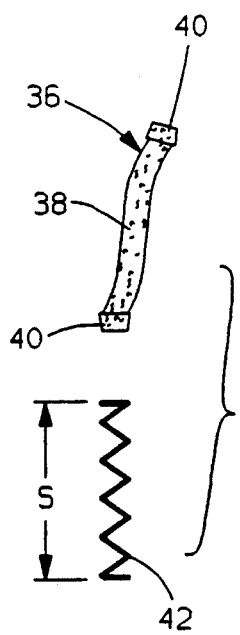
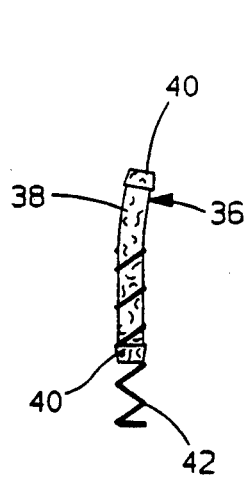
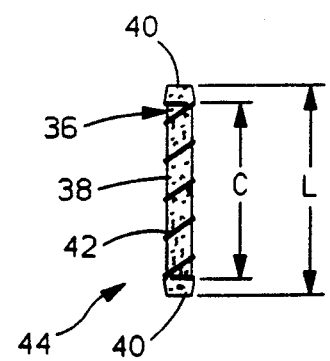
FIG. 2
FIG. 3
FIG. 4
FIG. 5

WICK FEED BEARING LUBRICATION SYSTEM

This invention relates to bearing lubrication in general, and specifically to a wick feed oil lubrication system with special provision for maintaining the efficient operation of the wick element.

BACKGROUND OF THE INVENTION

Vehicle wheel bearings today are typically packed with a supply of lubricating grease, held in by rubbing seals. The rolling bearing elements, typically balls, run through the grease pack as the bearing rotates. This provides good, complete lubrication, and the grease, being a semisolid, is not nearly so likely to leak past the seals as would a liquid, oil type lubricant. This allows so called "sealed for life" designs. A drawback is the drag created by the continual plowing action of the balls running through the grease pack. This drag is translated into extra heat. Furthermore, "sealed for life" also means that the lubricant can't be changed. Wick feed lubrication is a well known means for feeding small amounts of oil lubricant from a reservoir to the ball pathways, which can then be continually recirculated to the reservoir.

Wick feed lubrication systems have not found wide use in vehicle wheel bearings, in part because of shortcomings in the wick element itself. The wick is a soft, oil absorbent material capable of capillary action. As a consequence, it is soft, with little internal rigidity. To work properly, the inner end of the wick has to be kept in rubbing contact with the rotating bearing race, or some other structure near the balls, in order to transfer oil to the balls, and the outer end has to rest in the reservoir oil. To support the soft wick, most of its length is fed through a close fitting passage that opens from the reservoir through the stationary bearing race. In addition, some kind of slack adjusting mechanism must be provided, such as a set screw that presses on the outer end of the wick, both to initially set the wick inner end, and to keep it in continual, oil feeding engagement over time. Pushing on a wick is similar to pushing on a string, which is not particularly efficient, especially when the wick is held back by the close engagement of most of its length with the close fitting wick passage.

SUMMARY OF THE INVENTION

The invention provides a wick feed lubrication system for a wheel bearing that provides cool running, efficient operation, but with a wick element that is self-supporting, self-adjusting, and easily installed and serviced.

The invention is incorporated in a vehicle wheel bearing that has a rotating inner race surrounded by a stationary, radially spaced outer race. Two axially spaced rows of bearing balls run between the races. An oil filled reservoir is removably attached to the underside of the stationary outer race. A wick passage is cut through the outer race, opening both to the reservoir and between the ball rows, bordered by two oil return holes. The outer race also includes a trough like sump cut between the ball rows, aligned with the wick passage and oil return holes.

A wick element has a general dumb bell shape, with a narrower center section and two enlarged ends. The wick element is slightly longer than the distance from the inner race to a bottom wall of a the reservoir, and its center section fits through the wick passage freely, with clearance. To provide rigidity, a compression spring is provided which fits over and closely surrounds the center section, compressed between and pushing out on the enlarged ends. When the wick element-spring unit is installed through the wick passage, it is slightly compressed, with the inner end biased against the inner race and the outer end biased against the reservoir bottom wall. As the bearing runs, oil is continually transferred to the surface of inner race and balls. Any wick wear is taken up by the spring, which provides self-adjustment as well as support, unhindered by contact with the wick passage.

DESCRIPTION OF THE PREFERRED EMBODIMENT

These and other objects and features of the invention will appear from the following written description, and from the drawings, in which:

FIG. 2 is a sectional view taken along the line 2—2 of FIG. 1;

FIG. 3 shows the wick element and spring prior to assembly;

FIG. 4 shows the spring being assembled to the wick element;

FIG. 5 shows the spring fully assembled to the wick element;

Figure 1:
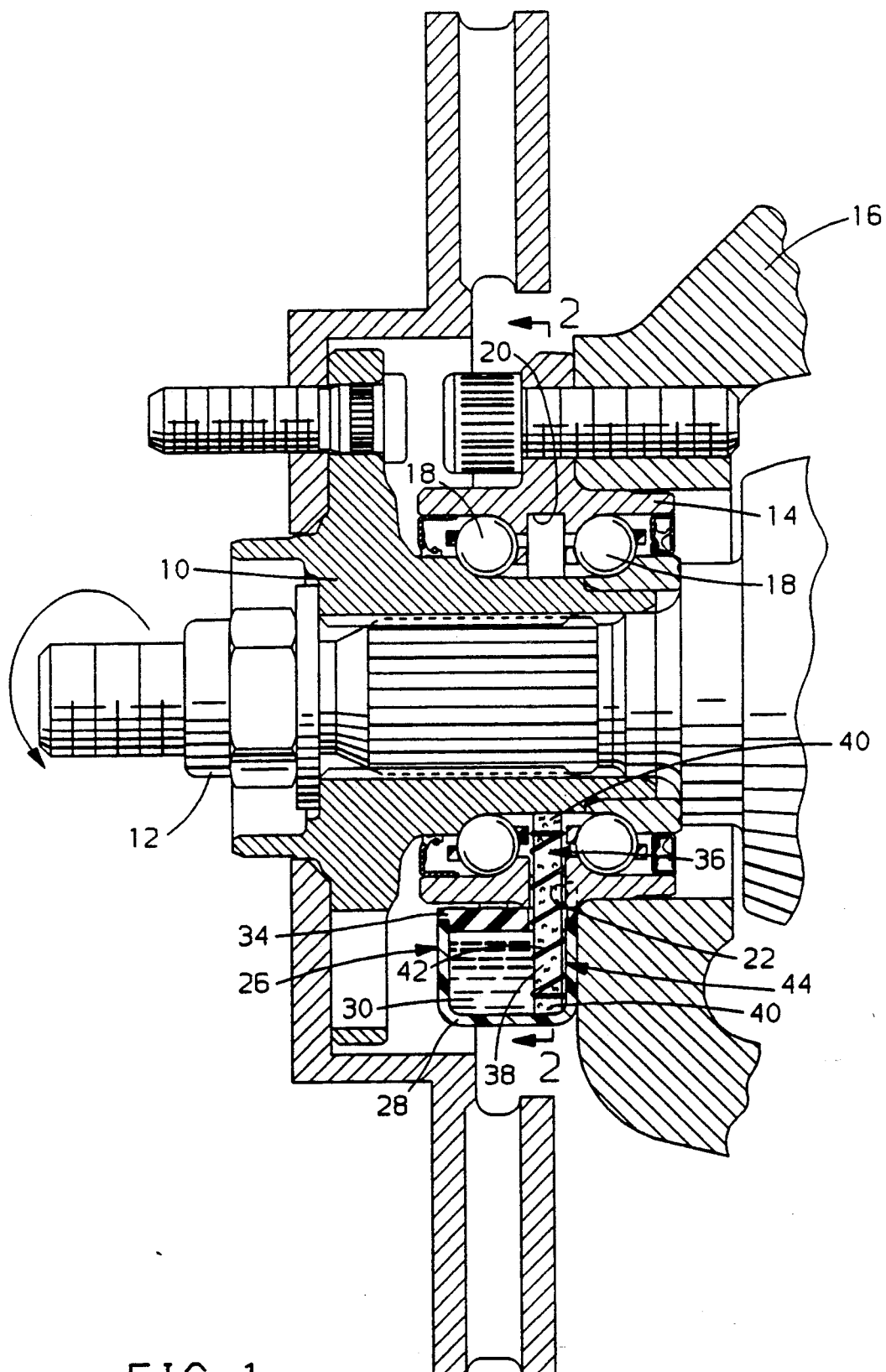
FIG. 1 shows a cross section of a vehicle wheel bearing incorporating a preferred embodiment of the invention.
Figure 6:
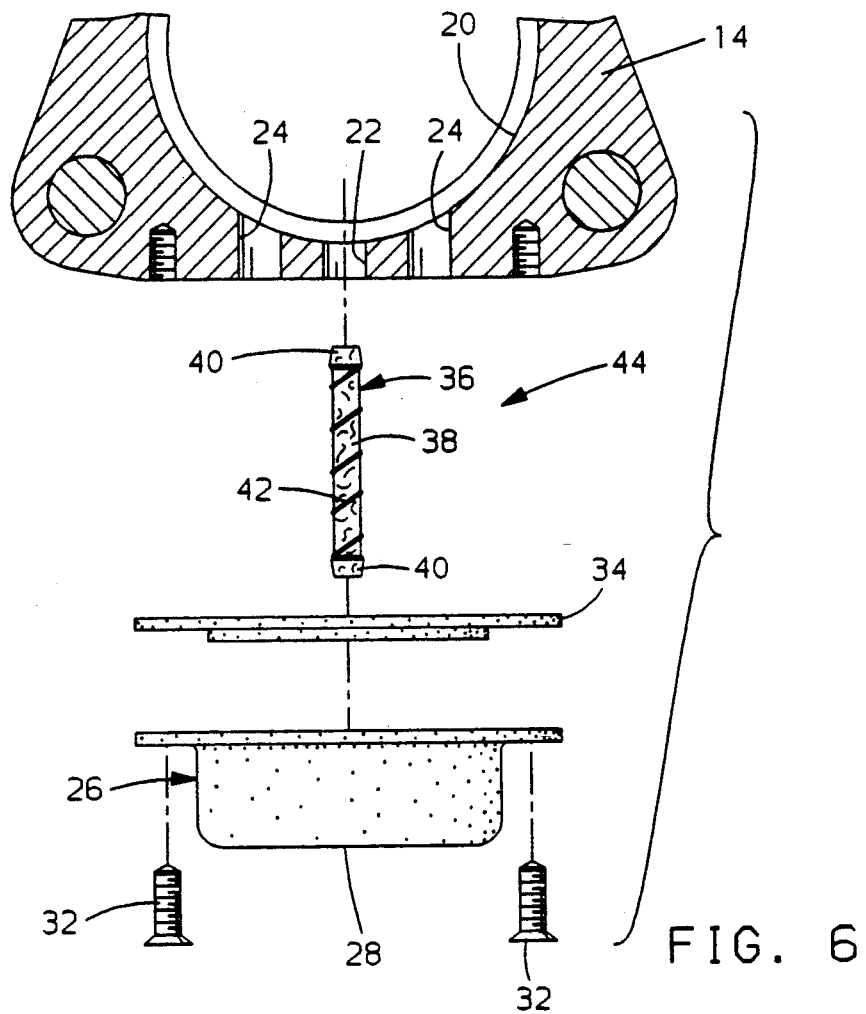
FIG. 6 is an exploded view of the oil reservoir and wick element-spring subassembly.

Referring first to FIGS. 1, 2 and 6, a vehicle wheel bearing includes an inner race or spindle (10). Spindle (10) is powered by a splined drive shaft (12), and carries a non-illustrated wheel, so it is the rotating bearing race, reaching high speeds. Spindle (10) is surrounded by a radially spaced outer race or hub (14), which is stationary, bolted to a vehicle suspension (16). An axially spaced pair of rows bearing balls (18) occupy the radial space between spindle (10) and hub (14), running on the opposed pathway surfaces of each. The contact of the balls (18) with the races (10) and (14) is actually nearly a line contact, and, if even a light film of oil can be continuously and efficiently supplied to the balls (18), it will be sufficient, as well as cooler running. Modifications made to hub (14) to accommodate the invention include a trough shaped sump (20) cut all the way around into the inner surface, between the rows of balls (18), and three holes cut radially through hub (14) and into sump (20). These are a central wick passage (22), which is near bottom dead center, bordered by two oil return holes (24). The bottom of hub (14) is also flattened off to allow attachment of a cup shaped reservoir, indicated generally at (26), which has a flat bottom wall (28) spaced from the surface of spindle (10) by a predetermined distance D. Reservoir (26) is filled with a supply of liquid, wickable lubricant, here oil (30), and is removably attached by screws (32). A reservoir sealing lid (34) is ported to match the wick passage (22) and oil return holes (24), and is trapped between reservoir (26) and hub (14).

Referring next to FIGS. 3 through 5, a wick element is indicated generally at (36). Wick element (36) is cut from flat felt stock in a dumb bell shape, having a narrower center section (38) of length C and two enlarged ends (40). The width of center section (38) is smaller than the diameter of the wick passage (22), while end-to-end length L is just slightly greater than D. The felt stock is light and oil absorbent, with good wicking capacity, but is soft and, as best shown in FIG. 3, substantially and not capable of remaining straight. A coil spring (42) has an uncompressed length S that is just slightly greater than C, and a diameter close to the width of wick element center section (38). Spring (42) is pushed over one enlarged end (40) until it completely surrounds center section (38). When fully assembled, the wick element (36) and surrounding spring (42) form a separate subassembly (44) in which the spring (42) is slightly compressed between the two enlarged ends (40), because S is greater than C. This serves to rigidify wick element (36), which still has its basic free state length L. Spring (42) has an additional function, described next.

Figure 7:
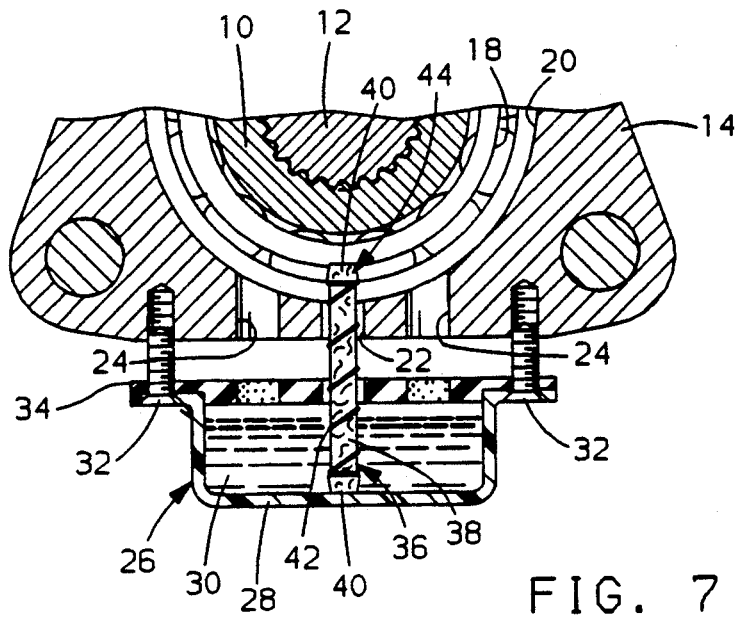
FIG. 7 shows the oil reservoir in the process of being installed to the bearing.

Referring next to FIGS. 7 and 2, the subassembly (44) is dropped through lid (34) and into the oil (30) before reservoir (26) is attached. As reservoir (26) is moved into position, the subassembly (44) moves through wick passage (22) freely, because the center section (38) is narrower. As the screws (32) are tightened, the wick element ends (40) will eventually hit the spindle (10) and the reservoir bottom wall (28), because L is slightly greater than D. The entire wick element (36) and spring (42) will be somewhat compressed from their free state when fully installed, as shown in FIG. 2. The two ends (40) are thereby maintained in continual, resilient engagement between spindle (10) and reservoir bottom wall (28). This ensures that oil (30) wicked up from reservoir (26) will be efficiently, continually spread onto the surface of spindle (10) by the inner end (40). From there, as shown by the arrows in FIG. 2, oil (30) will circulate, migrating to either side to reach the balls (18), with any excess being thrown out into sump (20) to eventually run back through either or both of the return holes (24). Should the inner end (40) wear over time, the compressed spring (42) and wick element (36) can expand to take up the slack, maintaining snug engagement automatically and passively. Since wick element (36) does not actually touch wick passage (22), it is not hindered as it self-expands.

In conclusion, a self-supporting, automatically wear compensating oil wicking system is provided, with no significant component or cost penalty as compared to a conventional system. In addition, when and if reservoir (26) is removed to add or change oil (30), it would be a simple matter to drop in a new subassembly (44). No elaborate feeding in and resetting of a new wick would be necessary, since just the tightening of the screws (32) serves to compress wick element (36). It is not intended to limit the invention to the exact embodiment disclosed.

The embodiments of the invention in which an exclusive property or privilege is claimed are defined as follows:

1. A wick feed lubrication system for a bearing of the type having a rotating inner race surrounded by a stationary, radially spaced outer race between which a row of rolling elements run, comprising,
  a sealed, liquid lubricant containing reservoir attached beneath said outer race and having a bottom wall spaced from said outer race and having a bottom wall spaced from said outer race,
  said outer race further having a wick passage opening from said reservoir to said radial space,
  a wick element of flexible, lubricant absorbent material passing through said wick passage, said wick element having a center section narrow enough to have clearance from said wick passage, enlarged ends, and a free state, end-to-end length sufficient to reach from said inner race to the reservoir bottom wall, and,
  a compression spring closely surrounding said wick element center section and biased against said wick element enlarged ends, thereby maintaining said wick element substantially straight and continually biased snugly between said inner race and reservoir bottom wall without interference from said wick passage,
  whereby oil is efficiently transferred from said reservoir to said inner race.

2. In a wick feed lubrication system for a bearing of the type having a rotating inner race surrounded by a stationary, radially spaced outer race between a row of rolling elements run, said outer race having a wick passage opening to said radial space, and a sealed, liquid lubricant containing reservoir attached beneath said outer race and wick passage opening, said reservoir having with a bottom wall spaced from race, the improvement comprising,
  a wick element of flexible, lubricant absorbent material sized to pass through said wick passage, said wick element having a center section narrow enough to have surrounding clearance from said wick passage, enlarged ends, and a free state, end-to-end length sufficient to reach from said inner race to the reservoir bottom wall, and,
  a compression spring closely surrounding said wick element center section and biased against said wick element enlarged ends, thereby maintaining said wick element substantially straight and continually biased snugly between said inner race and reservoir bottom wall without interference from said wick passage,
  whereby oil is efficiently transferred from said reservoir to said inner race.

* * * * *